(12) United States Patent
Burns, II

(10) Patent No.: US 6,652,189 B2
(45) Date of Patent: Nov. 25, 2003

(54) METHOD FOR A MIGRATORY FISH BYPASS CHANNEL WITH NATURAL FEATURES

(76) Inventor: Gordon Charles Burns, II, 2120 S. Reserve #360, Missoula, MT (US) 59801

(*) Notice: Subject to any disclaimer, the term of this patent is extended or adjusted under 35 U.S.C. 154(b) by 0 days.

(21) Appl. No.: 10/131,535
(22) Filed: Apr. 25, 2002
(65) Prior Publication Data US 2002/0187006 A1 Dec. 12, 2002

Related U.S. Application Data

(60) Provisional application No. 60/287,951, filed on May 1, 2001.

(51) Int. Cl.$^7$ ............................. E02B 8/08; E02B 5/04
(52) U.S. Cl. ......................... 405/81; 405/84; 119/203; 119/219
(58) Field of Search ............................. 405/81, 82, 83, 405/84; 119/219, 220, 203

(56) References Cited

U.S. PATENT DOCUMENTS

| | | | | |
|---|---|---|---|---|
| 3,772,891 A | * | 11/1973 | Raistakka | 405/83 |
| 3,938,340 A | * | 2/1976 | Downs | 405/83 |
| 3,962,876 A | | 6/1976 | Phillips | |
| 4,260,286 A | | 4/1981 | Buchanan | |
| 4,437,431 A | | 3/1984 | Koch | |
| 4,629,361 A | | 12/1986 | Zimmerman | |
| 4,740,105 A | * | 4/1988 | Wollander | 405/83 |
| 4,904,114 A | | 2/1990 | Warner et al. | |
| 5,161,913 A | | 11/1992 | Boylan | |
| 5,660,499 A | | 8/1997 | Bethune | |
| 6,273,639 B1 | | 8/2001 | Eikrem et al. | |
| 6,325,570 B1 | * | 12/2001 | Pohjamo | 405/81 |

FOREIGN PATENT DOCUMENTS

| | | | |
|---|---|---|---|
| JP | 4200696 | * | 7/1992 |
| JP | 07150598 | * | 6/1995 |
| JP | 10102463 | * | 4/1998 |
| JP | 11117272 | * | 4/1999 |
| JP | 2000233194 | | *8/2000 |

OTHER PUBLICATIONS

Adams, Johnson, Rondorf, Anglea and Wik, Biological Evaluation of the Behavorial Guidance, Structure at Lower Granite Dam on the Snake River, Washington in 1998, Behavioral Technologies for Fish Guidance, Charles C. Coutant Ed., Aug. 30–31, 1999, pp. 145–147, American Fisheries Society Symposium 26, American Fisheries Society, Bethesda, MD, U.S.A.

U.S. Army Corps of Engineers Walla Walla District, Summary Improving Salmon Passage—The Lower Snake River Juvenile Salmon Migration Feasibility Report/Environmental Impact Statement, Dec. 1999, pp. 1–5, Draft, U.S. Army Corps of Engineers, Walla Walla, WA, U.S.A.

Giorgi, Johnson and Erho, Critical Assessment of Surface Flow Bypass Development in the Lower Columbia and Snake Rivers During 1995–1996, Advances in Fish Passage Technology: Engineering Design and Biological Evaluation, Mufeed Odeh Ed., 2000, pp. 41–55, American Fisheries Society, Bioengineering Section, Bethesda, MD U.S.A.

(List continued on next page.)

Primary Examiner—Jong-Suk (James) Lee
(74) Attorney, Agent, or Firm—Gouch, Shanahan, Johnson & Waterman; William L. MacBride, Jr.

(57) ABSTRACT

A method and system allowing fish to migrate upstream and downstream, bypassing dams, obstructions, either man-made or natural, safely, freely and in a natural manner. The system consists of a meandering "nature-like" channel constructed of pneumatically placed concrete, shotcrete or gunite that simulates a waterway bed condition. The construction of riffles, ledges, undercut banks and other natural-like features to provide a foundation for the placement of fish habitat, such as gravel beds, boulders, logs, and the like. The placement of sand, gravel, cobbles and such to create and provide an aquatic environment to sustain plant and aquatic life. The introduction of plants and other aquatic life to provide forage, cover and a year around natural-like environment within a river or stream-like migratory bypass channel.

4 Claims, 8 Drawing Sheets

OTHER PUBLICATIONS

Mufeed Odeh, Fish Passage Innovation for Ecosystem and Fishery Restoration, Innovations in Fish Passage Technology, Mufeed Odeh Ed., 1999, pp. 1–24, American Fisheries Society, Bethesda, MD, U.S.A.

Parasiewicz, Eberstaller, Weiss and Schmutz, Conceptual Guidelines for Nature–like Bypass Channels, Jungwirth, Schmutz and Weiss Ed., Fish Migration and Fish Bypasses, 1998, Symposium 1996, pp. 348–362, Fishing New Books Blackwell Sciences Ltd., Oxford, United Kingdom.

Eberstaller, Hinterhofer and Parasiewicz, The Effectiveness of Two Nature–like Bypass Channels in an Upland Austrian River, Jungwirth, Schmutz and Weiss Ed., Fish Migration and Fish Bypasses, 1998, Symposium 1996, pp. 363–383, Fishing New Books Blackwell Sciences Ltd., Oxford, United Kingdom.

Mader, Unfer and Schmutz, The Effectiveness of Nature–Like Bypass Channels in a Lowland River, the Marchfeldkanal, Jungwirth, Schmutz and Weiss Ed., Fish Migration and Fish Bypasses, 1998, Symposium 1996, pp. 384–402, Fishing New Books Blackwell Sciences Ltd., Oxford, United Kingdom.

Rolf–Jurgen Gebler, Examples of Near–natural Fish Passes in Germany: Drop Structure Conversions, Fish Ramps and Bypass Channels, Jungwirth, Schmutz and Weiss Eds., Fish Migration and Fish Bypasses, 1998, Symposium 1996, pp. 403–419, Fishing New Books Blackwell Sciences Ltd., Oxford, United Kingdom.

* cited by examiner

METHOD FOR A MIGRATORY FISH BYPASS CHANNEL WITH NATURAL FEATURES

This application claims priority from the provisional patent application filed May 1, 2001, Application No. 60/287,951 filed May 1, 2001.

BACKGROUND

Fish, like birds, migrate; their method and success in doing so, however, differs vastly. Birds typically fly south for the winter, whereas fish, both adult and juvenile, may migrate either upstream or downstream. Further, while birds flying through the air often reach their migratory destination unhindered, migrating fish today encounter an ever-growing number of man-made obstacles blocking their traditional migrating pathways. For example, the lower Columbia River, a well known migratory pathway for salmon, steelhead and sturgeon, has five dams between the Pacific Ocean and the mouth of the Snake River. Similarly, the Snake River, also a traditional fish migratory pathway, has four hydroelectric facilities on the first 110 miles of river.

The numerous dams and hydroelectric facilities that block traditional fish migratory pathways throughout the Unites States, as well as other countries, present a continuing threat to the existence of numerous fish species. As a prime example, on the Pacific coast today, salmon and steelhead face the danger of extinction, due in part to the fact the juvenile fish mortality rate for those passing through or over man-made obstructions can be as high as 30 percent. On the Atlantic coast, striped bass, eels and Atlantic salmon face a similar plight.

Declining anadromous fish stocks have prompted many studies to determine the causes of increased fish mortality rates, in particular, the enormous concentrated effort led by the U.S. Army Corps of Engineers during the 1990s. At the direction of the National Marine Fisheries Service, the Corps of Engineers, Bonneville Power Administration, Bureau of Reclamation, Environmental Protection Agency, U.S. Fish and Wildlife Service, and various agencies of the States of Idaho, Oregon and Washington cooperated in an intensive study of the Snake River. The study resulted in information on salmon and steelhead migratory patterns and problems.

The primary problem is that natural and manmade obstructions, such as dams and locks, have prevented upstream and/or downstream migration of anadromous and migratory fish. Recent efforts to solve this problem have produced mixed results.

A hydroelectric facility commonly consists of a dam wherein a large quantity of the river water is stored temporarily and passes through hydroelectric generating turbines and the like in a manner that is known to those skilled in the art. It has been shown that the mortality rate for juvenile fish passing through or over such facilities is from 10–30 percent. Thus, in passing through a series of hydroelectric facilities the number of fish surviving to reach the ocean is significantly reduced compared to the number that started the journey.

Recent efforts to solve this problem include the use of collection systems and then transportation by tank truck or barge to the ocean. The use of behavioral guidance systems, trucking and barging of smolts has not been as effective as hoped. Other efforts have been made by the use of conduits around the dam to allow fish to pass. These efforts have produced marginal results as is witnessed by the continued decline of returning fish causing them to be listed as endangered.

A similar problem exists with the upstream migration of adult fish to their natal or spawning areas. The existing method of using fish ladders located at the tailrace or by the turbine discharge area has had marginal success. The upstream migrating adults enter this area of turbulence and become confused. They have difficulty locating the fish ladders' current and thus fail to negotiate the dam. Those that do find the ladders risk injury or suffer from exhaustion and are in a weakened condition if they reach a spawning area.

Another problem for upstream migrating adult fish is the absence or lack of suitable spawning areas. Presently, a large percentage of adult fish are captured at hatchery sites and stripped of their eggs manually. These hatchery-raised juvenile fish are less likely to have the survival skills necessary to survive downstream migration.

DESCRIPTION OF THE RELATED ART

The problems that dams and other hydroelectrical facilities pose by blocking migrating fish has long been recognized, and the need to provide an effective passage for migratory and anadromous fish has been recognized for some time, as well. In the past there have been attempts to utilize fish ladders or conduits for diverting fish both upstream and downstream around hydroelectric dams or the like for the intended purpose of attempting to protect fish from passing through hydroelectric turbines and the like where they are generally destroyed in large numbers. None of the heretofore devised or conceived methods have included a method and system of creating an artificial condition that in essence simulates, duplicates or replicates the natural stream or river from which migrating fish enter hydroelectric dam reservoirs. Further, such prior attempts have in no manner encompassed a variety of techniques to provide a natural-like surface stream or river condition that induces rather than forces fish to safely traverse around the dam area and to discharge them into the natural stream below the dam.

Several attempts at addressing and solving these problems have heretofore been offered, such as fish ladders and mechanical, conduit by-pass systems and other mechanical devises, of either limited scope and effectiveness or requiring a high degree of maintenance, e.g., U.S. Pat. No. 3,377,805 (1968), U.S. Pat No. 3,962,876 (1976), U.S. Pat. No. 4,260,286 (1981), U.S. Pat. No. 4,437,431 (1984), U.S. Pat. No. 4,629,361 (1986), U.S. Pat. No. 4,904,114 (1990) and U.S. Pat. No. 5,161,913 (1992). U.S. Pat No. 3,377,805 to Warner (1968) discloses a fish elevator to raise and lower fish around an obstruction. A similar attempt was proposed by Warner and Schjelderup, U.S. Pat. No. 4,904,114. U.S. Pat. No. 3,962,876 to Phillips (1976) discloses a simple fishway. U.S. Pat. No. 4,437,431 (Koch), U.S. Pat. No. 4,629,361 (Zimmerman) and also U.S. Pat. No. 5,161,913 (Boylan) utilize conduit systems.

Each of the attempted solutions in the above patents, however, suffers from one or more of the following disadvantages: it requires costly man-made mechanical devices, artificial lighting or pumps; it is a complex system requiring high maintenance; it requires artificial syphoning and oxygenating systems; it requires placement of a device at the face, in the reservoir or within the tailrace of a dam limiting its effectiveness; it does not account for varying adult and juvenile fish habits or differences in upstream and downstream migration; the draw of the turbine intake competes for juvenile fish and the turbine discharge confuses the adult fish; it lacks adequate means to attract and entice fish to utilize the by-pass or throughway system; it does not effectively solve the problem of a dark or enclosed passageway discouraging fish to enter, it does not prevent darkening of a fish passageway, resulting from silt or algae accumulation to a translucent conduit, thereby discouraging fish; it is cost-prohibitive for any, some or all of the foregoing reasons; and it is not readily adaptable to a wide variety of fish species' migratory habits. Further, none of the prior solutions offered incorporate a method and system in and to which fish would most naturally adapt and likely thrive—that of a simulated, duplicated or replicated natural stream or river similar to that in which migrating fish travel, prior to entering any area of man-made stream or river obstruction, such as a reservoir to a hydroelectric facility. Moreover, the prior solutions do not encompass techniques to provide a natural-like surface stream or river condition that induces, rather than forces, fish to safely traverse around the obstructed area and discharge the fish into the natural stream below the obstruction. In these respects, there is thus no prior art relating to the present invention.

Because of the disadvantages of the existing methods and systems designed to allow migrating fish to bypass or pass through man-made obstructions and because of the continuing decline of fish populations, the need for a natural feature based method and system is paramount. Such a method and system offers several advantages over existing methods and systems: it is economical, since it requires minimal maintenance once in place; it can be readily utilized for both adult and juvenile fish migrating either upstream or downstream; because it mimics the waterway from which the migrating fish come, by its nature it will entice fish; and it is flexible enough to use with any migrating species.

SUMMARY

This invention is a method and system for providing upstream and downstream migrating fish a means for bypassing man-made obstructions, such as hydroelectric facilities, and natural obstructions such as waterfalls or rapids, by simulating or replicating the natural stream conditions to which the fish are accustomed and diverting them through the simulated or replicated condition around the obstructions. The method and system are further characterized by utilizing features that appeal to the natural migratory tendencies and attract the fish to and entice them to use the desired channel to bypass the obstruction to their migration. This method and system is more particularly directed to the creation of an artificial stream or river inlet in the relatively quiet waters behind the obstruction and in the downstream migratory path of the fish, and thus simulating or replicating what would be the natural course for the fish to take together with channeling them into a simulated or replicated river or stream; around the obstruction and into the natural river course below the obstruction at a great enough distance to attract upstream migratory fish before they reach the tailrace or base of the obstruction.

My invention is an effort to provide a feasible, cost-effective, natural-like solution to the problem of natural and man-made obstructions, such as dams and locks, preventing upstream or downstream migration of anadromous and migratory fish. Though this invention focuses on the needs of salmon and steelhead, it is readily adaptable to other migratory species.

It is an object of this invention to provide a river-like channel to convey juvenile and adult fish around dams and obstructions.

Another object of this invention is to provide natural-like features for the migrating fish and deceive them into believing they are in a river.

Another object of this invention is to provide for a food source so fish will migrate at their own natural pace.

A further object of this invention is to create an environment that allows juvenile fish to prepare for adulthood in a natural manner.

Past attempts to utilize fish ladders, or conduits for diverting fish both upstream and downstream around hydroelectric dams or the like for the intended purpose of attempting to protect fish from passing through hydroelectric turbines and the like have not included this invention's method of creating an artificial condition which in essence simulates, duplicates or replicates the natural stream or river from which they entered the hydroelectric dam reservoir. Further, such prior attempts have in no manner encompassed a variety of techniques to provide a natural-like surface stream or river condition which induces rather than forces fish to safely traverse around the dam area and to discharge them into the natural stream below the dam. In this respect it can be considered that there is no prior art whatsoever relating to the present invention.

BRIEF DESCRIPTION OF THE DRAWINGS

The aforementioned features, aspects and advantages of the present invention will become better understood with regard to the following description and accompanying drawings, where.

REFERENCE LETTERS & NUMERALS IN DRAWINGS

| | |
|---|---|
| B.P. | Migratory fish bypass channel |
| D. | Dam |
| O.B. | Oxbow section of-Alternate embodiment |
| R. | Reservoir |
| D. | Thalweg or bulk flow |
| 10. | Bypass channel inlet |
| 11. | Inlet flow control weir |
| 12. | Reciprocating bulkhead |
| 13. | Transitional flow plate |

-continued

| | |
|---|---|
| 14. | Transitional flow plate pivot |
| 20. | Channel gradient above an obstruction |
| 22. | Pneumatically-placed concrete, shotcrete or gunite channel |
| 31. | Undercut bank |
| 32. | Boulders |
| 33. | Downed tree with root mass |
| 34. | Intersticed or cobbled area |
| 35. | Cleaned sand, gravel and cobbles |
| 36. | "Scour" hole under log |
| 37. | Log across channel |
| 38. | Shallow, gravel and sand areas for rest and feeding |
| 39. | Ledges and riffles |
| 40. | Channel gradient below an obstruction or dam |
| 50. | Tributary-Alternate embodiment |
| 51. | Artificial spring |
| 52. | Water supply pipe |
| 53. | Seal flanges |
| 54. | Boulder support grate |

DETAILED DESCRIPTION

I have reviewed the research results of the aforementioned studies conducted by various federal and state agencies and universities. As a result of these studies I have now developed a system and method of bypassing these hydroelectric facilities and other natural or man-made obstructions that take into account the natural instincts, desires, actions and reactions, migratory paths and migratory habits of both upstream and downstream migrating fish.

What I have done is create a natural-like stream or river inlet in the reservoir above the forebay and directly in the downstream migratory path of the juvenile fish. This inlet directs the fish into an artificial channel that simulates, duplicates or replicates the natural stream or river obstructed by the dam. I accomplish this by excavating a channel around the dam and lining this excavation with pneumatically-placed concrete, shotcrete or gunite to create a bedrock or riverbed condition suitable for the retention of native sand and gravels. While lining this channel, riffles, ledges, undercut banks and other natural features will be incorporated to create flows and velocities similar to a natural stream or river. Upon completion of the lining, the larger excavated materials and other natural resources such as dead tree remnants will be placed in a manner mimicking the original waterway. The smaller excavated material, such as sand, gravel and cobbles, will then sporadically be placed in the channel. Water would then be released into the channel to simulate flood or springtime flows. These flows would naturally sort the sand, gravels, and cobbles to create conditions suitable for the introduction of native aquatic forage species, including plants and other aquatic life forms. This river-like bypass would reenter the river below the dam at a sufficient distance below the dam to eliminate confusion for the upstream migrating adult fish. I intend hereby to encompass within this language any structure presently existing or developed in the future which performs the same function as the structures set forth.

Figure 1A:
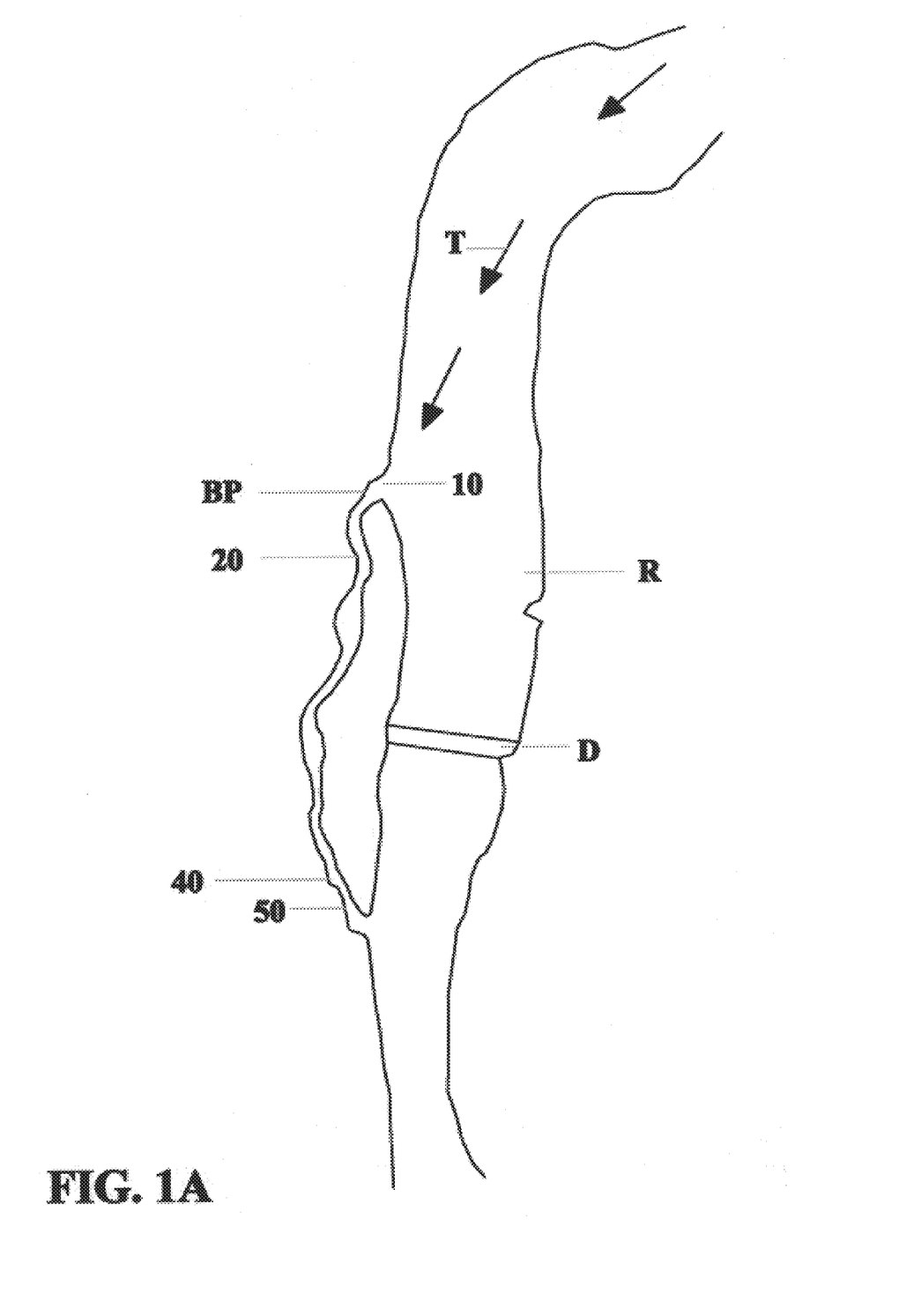
FIG. 1A is a simplified schematic, illustrating my invention.

An overview of the system is shown in FIG. 1A. This illustrates a typical hydroelectric facility with the migratory fish bypass channel BP in place. It shows a dam D and the reservoir R behind the dam D. It further shows the placement of the bypass channel inlet 10 in the path of the main flow or thalweg T.

An objective of the preferred embodiment is to move adult and juvenile fish around an obstruction or dam D via a bypass channel BP. The bypass channel BP seeks to simulate, duplicate, or replicate a natural river or stream course.

Figure 2:
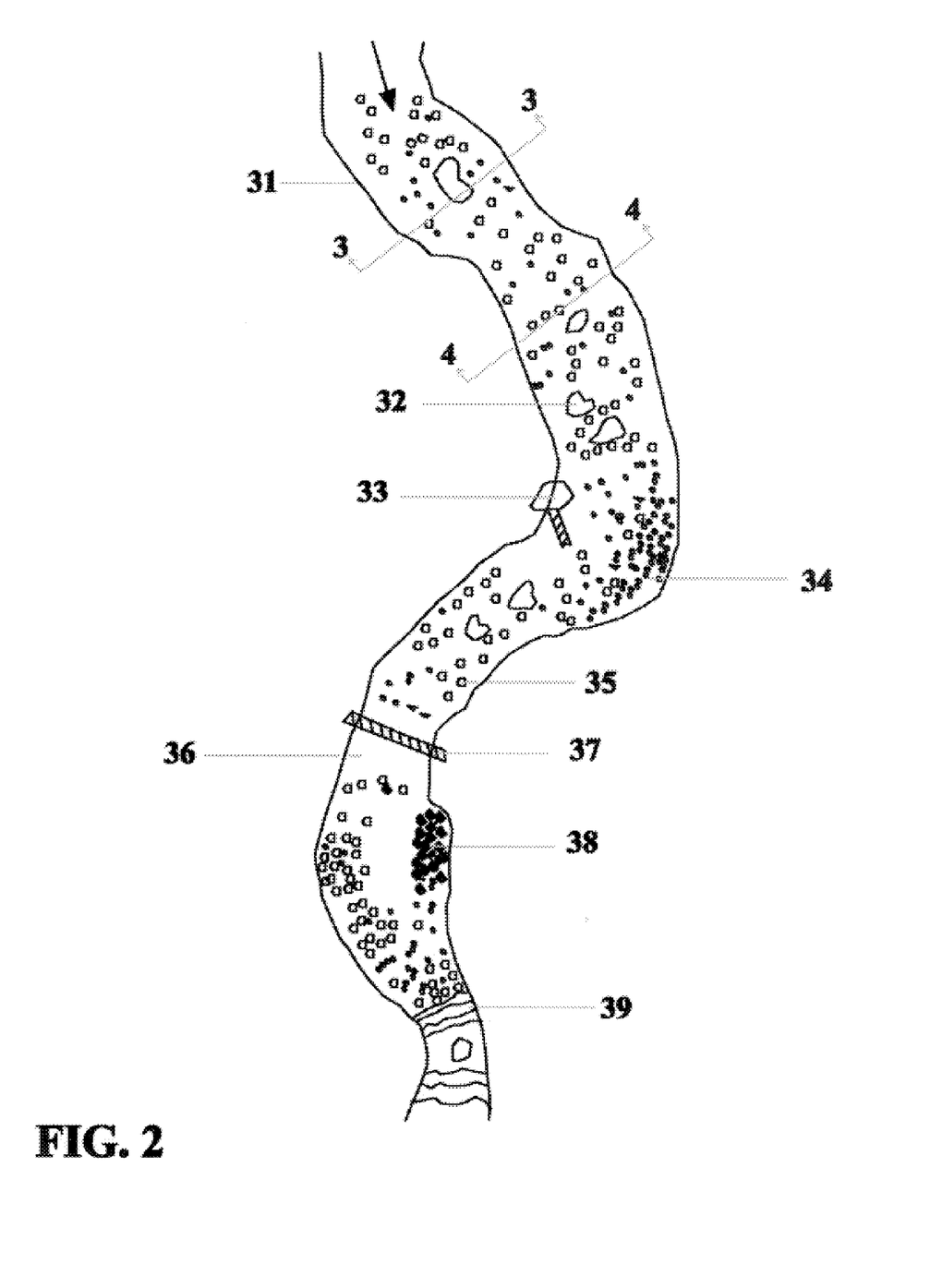
FIG. 2 illustrates a typical section of FIG. 1A.

Referring now to FIG. 2: This illustrates a typical section of the invention. It shows a variety of natural-like features 31–39 that would be incorporated into the bypass channel BP. It is meant to illustrate and not to limit the ability of the invention to replicate or duplicate a river or stream.

Still referring to FIG. 2 that shows the natural features 31–39: it shows the placement of sand, gravel, and cobbles 35 to form a natural-like environment. It also shows the placement of boulders 32, trees 33, and gravel bars 38.

FIG. 2 further shows the creation of ledges and riffles 39. It shows undercut banks 31 and scour holes 36 under obstructions 37.

Figure 3:
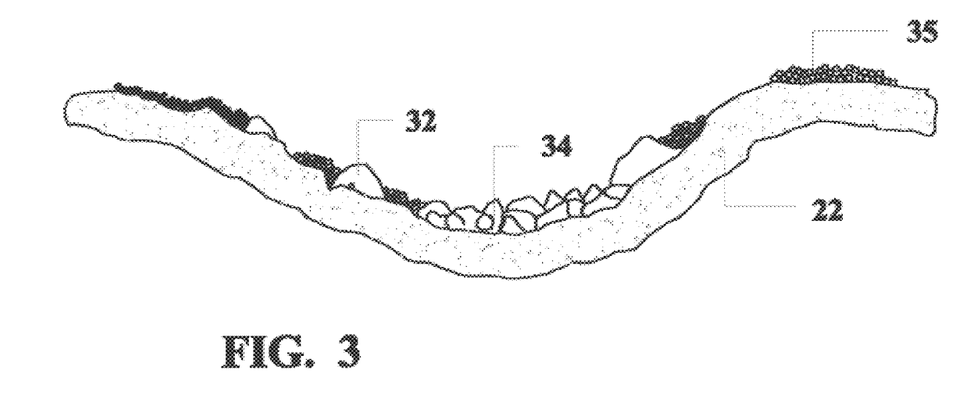
FIG. 3 is a cross section of a typical channel configuration.

FIG. 3 is a cross section of a typical channel design. It shows the placement of sand, gravel, cobbles 35 and the like, over a pneumatically-placed concrete, shotcrete or gunite 22 shell.

FIG. 3 illustrates a deeper center channel for low water flow conditions. It also illustrates the provision for peak or flood water flows through the design of the long sloping banks.

This channel is constructed of pneumatically-placed concrete, shotcrete, or gunite 22. It incorporates a mix design of a minimum of seven (7) sacks of cement (658 pounds or 298.5 kilograms) to 2800 pounds (1270.1 kilograms) of concrete sand. The mix also makes use of concrete additives. Such additives include, but are not limited to, the following: silica fume for durability; Kryton Internal Membrane for water proofing; and steel fibers to enhance the strength of the simulated bedrock.

Figure 4:
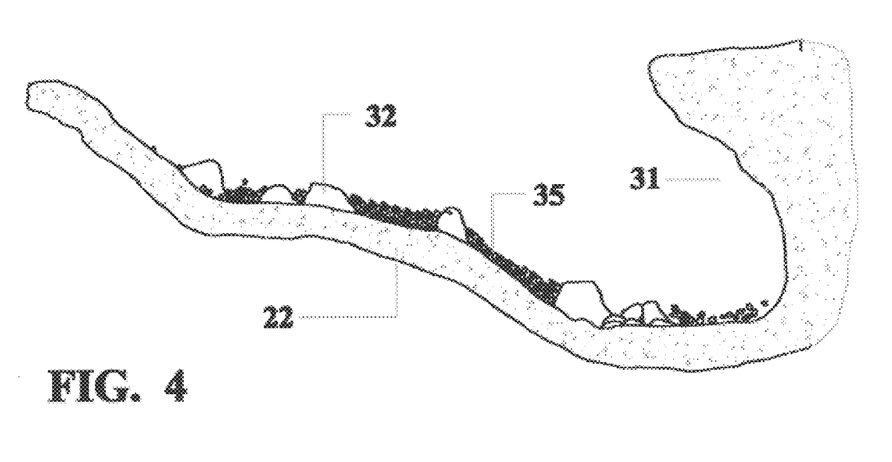
FIG. 4 is a cross sectional view of an "undercut bank" natural feature.

FIG. 4 shows a cross section of the bypass channel BP at an undercut bank 31. The distribution of sand, gravel, cobbles 35, and the like provide an environment suitable for sustaining aquatic life. The undercut bank 31 provides protection from avian and terrestrial predators.

Figure 5A:
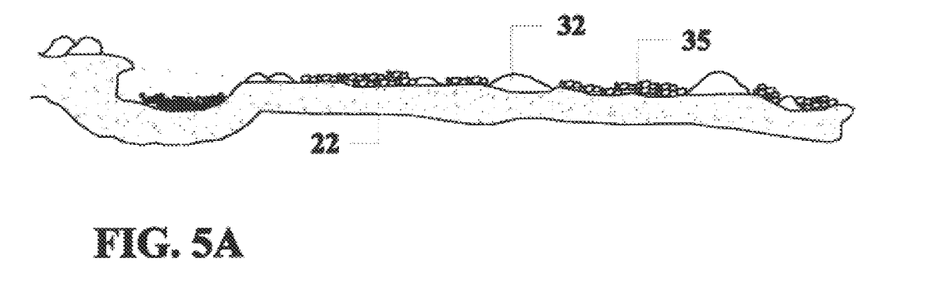
FIG. 5A is a profile of the channel gradient above a dam or obstruction.
Figure 5B:
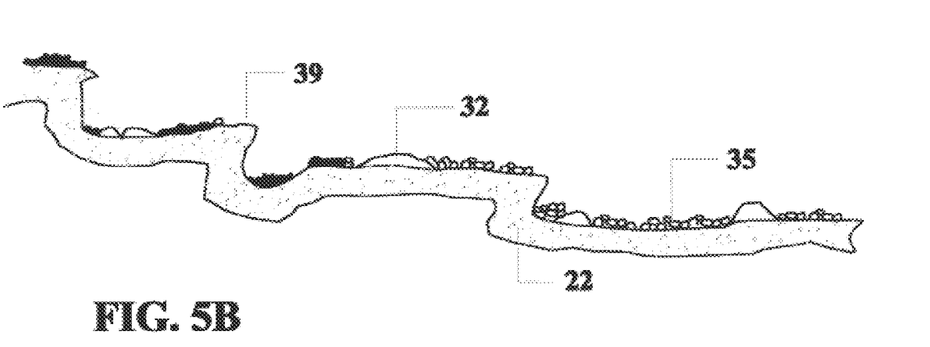
FIG. 5B is a profile of the channel gradient below a dam or obstruction.

FIGS. 5A and 5B illustrate how I have used two different gradients for the bypass channel BP. FIG. 5A provides the bypass channel gradient or drop or pitch above the dam 20. Its lower gradient allows for a long serpentine course while minimizing the bypass channel BP depth. This reduced depth means a reduced cost of placement. It also minimizes the surface disruption above the dam. The gradient profile below the dam 40 is significantly steeper. This allows a flexibility in design.

Figure 6:
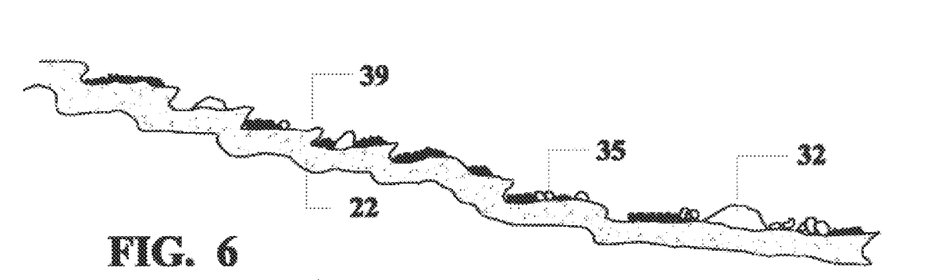
FIG. 6 illustrates a "ledges or riffles" section of the channel.

FIG. 5B and FIG. 6 illustrates how this is accomplished. The use of ledges and riffles 39 permits a quicker reduction in elevation.

The profile in FIG. 5B can be coupled with the profile in FIG. 5A below the dam. FIG. 5A allows the bypass channel BP to follow an original river terrace. FIG. 5B allows the bypass channel BP to drop from an upper to a lower terrace quickly and dramatically.

Figure 7A:
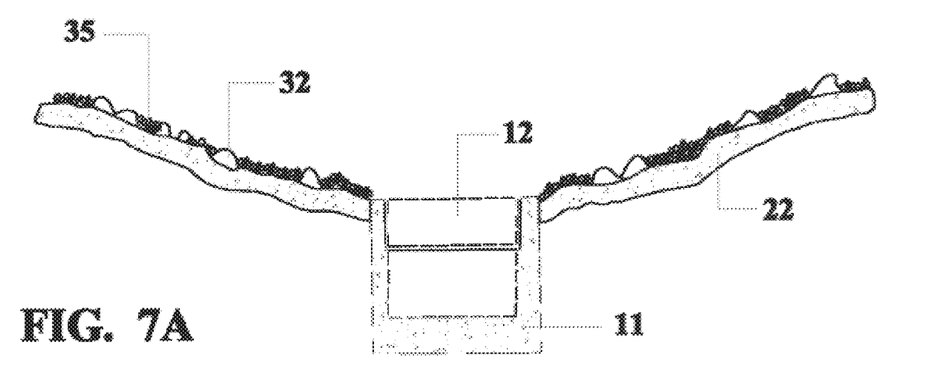
FIG. 7A is a sectional view of an optional inlet flow control weir.
Figure 7B:
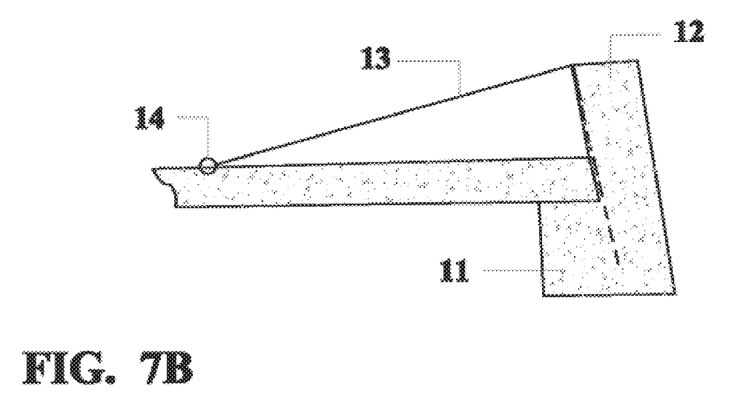
FIG. 7B is a profile of FIG. 7A.

FIGS. 7A and 7B show the use of a flow control weir 11 or head gate at the bypass channel inlet 10. This design is illustrative of such use. The use of a flow control weir 11 or head gate is optional. The individual project needs will dictate the design of the inlet 10, which could include a reciprocating bulkhead 12, a transitional flow plate 13 and a transitional flow plate pivot 14.

Figure 1B:
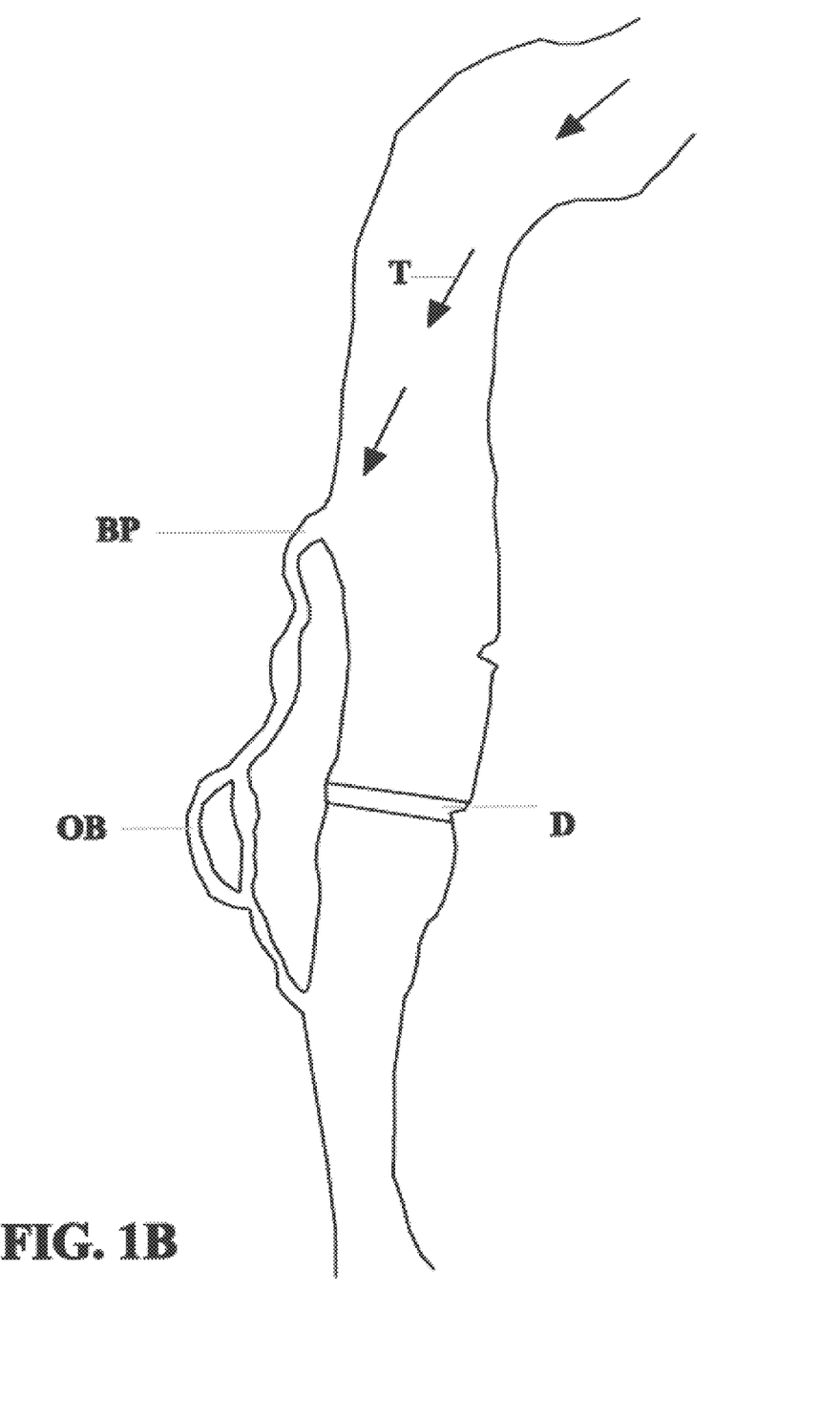
FIG. 1B is a view illustrating a particular feature of the schematic of my invention of FIG. 1A.

An alternate embodiment of the bypass channel BP is shown in FIG. 1B. I have shown a hydroelectric facility with the migratory bypass channel BP in place.

FIG. 1B differs from FIG. 1A in that an oxbow section OB of channel has been added. This oxbow section OB could be used as a spawning site. It could further be used as a rearing area for hatchery-produced fry or fingerlings.

The oxbow section OB would provide a more natural environment for the raising of smolt than the current hatchery conditions. This environment would better prepare smolt for their downstream migration and life as an adult.

Figure 1C:
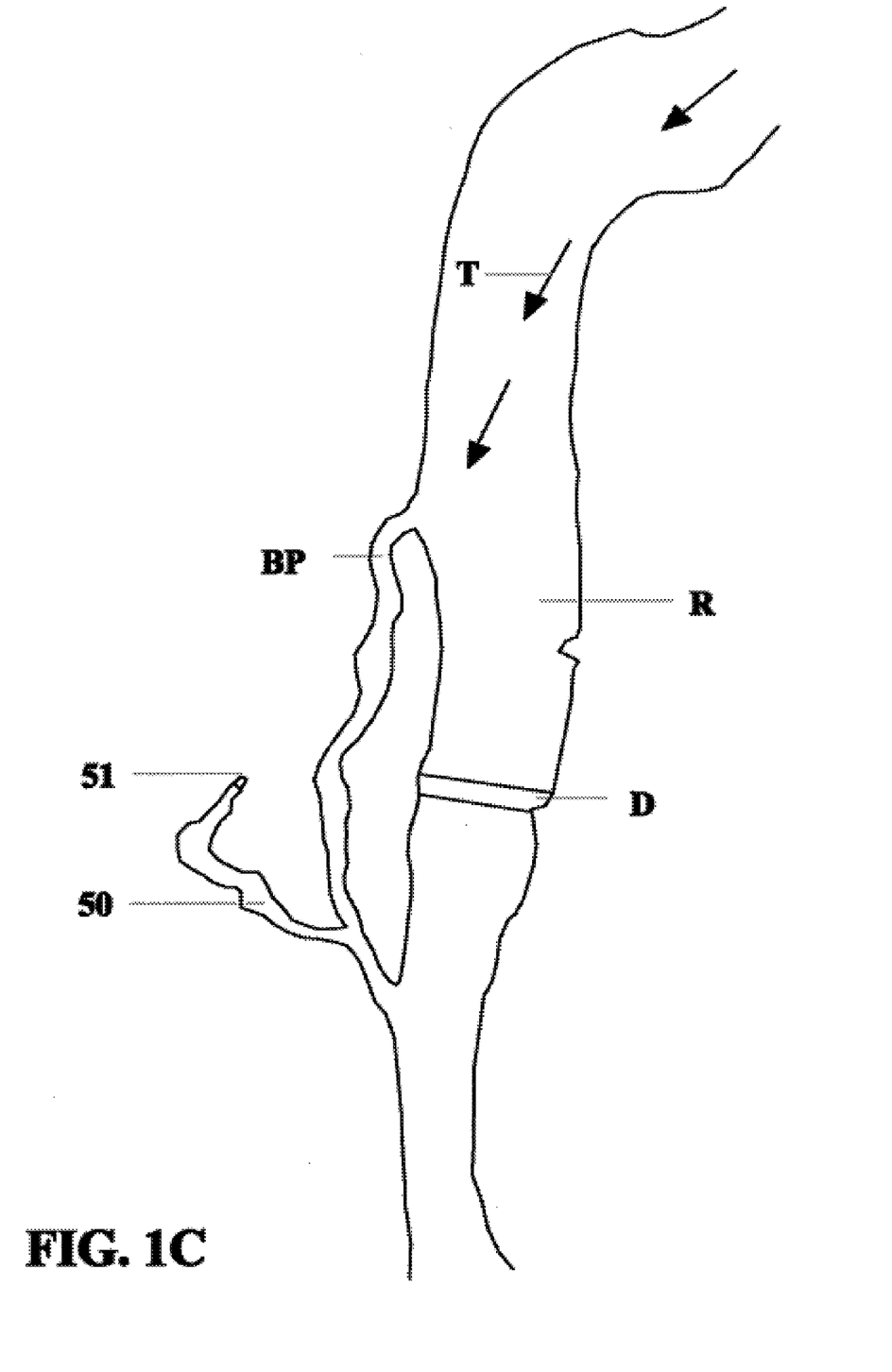
FIG. 1C is a simplified schematic of my invention illustrating an Alternate embodiment of the invention.

Another alternate embodiment is shown in FIG. 1C. It shows a hydroelectric facility and migratory fish bypass channel BP in place.

FIG. 1C differs from FIG. 1A and FIG. 1B through the addition of a tributary 50. This tributary 50 could function as a spawning site or rearing area.

Figure 8A:
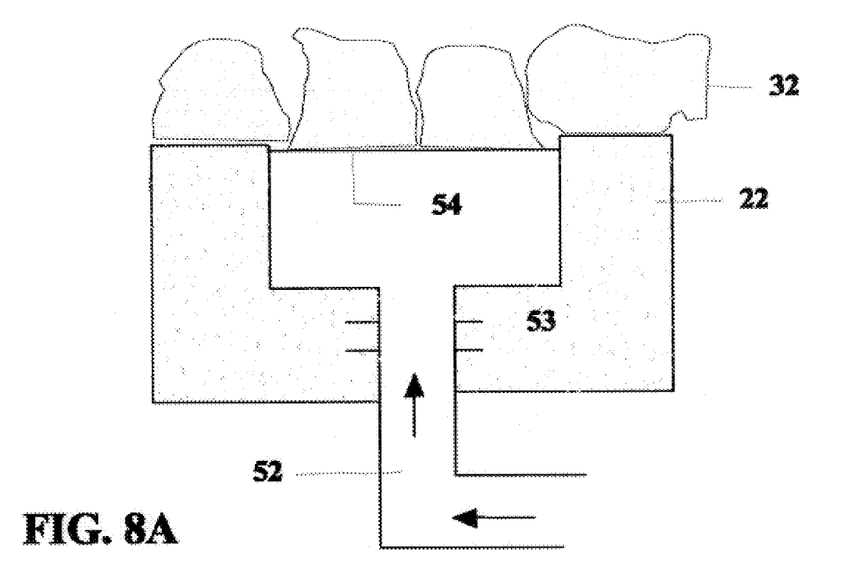
FIG. 8A is a sectional view of an artificial "spring" feature.
Figure 8B:
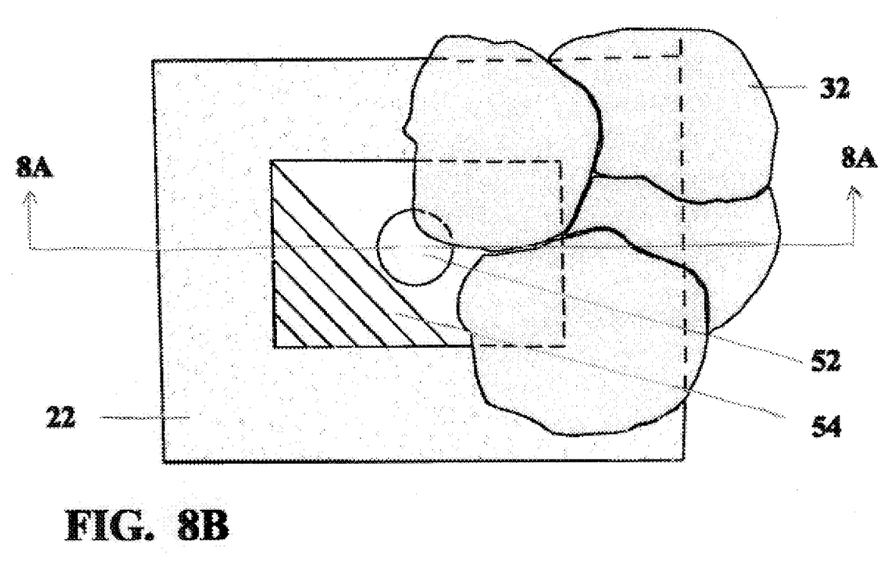
FIG. 8B is a simplified perspective of FIG. 8A.

A unique feature of that embodiment would be the creation of an artificial spring 51. FIG. 8A and FIG. 8B illustrate a typical construction, which includes a water supply pipe 52, seal flanges 53 and a boulder support grate 54.

The water source for this artificial spring 51 could come from above the dam. Sufficient flow and pressure could be attained through elevation or head pressure.

The water source for the artificial spring 51 could also be pumped where this proved to be more efficient. Another unique feature of this embodiment would be the use of commercial chillers to maintain optimum water temperatures. Since the use of chillers and mixing valves in other applications is a common technique, it has not been illustrated.

Yet another embodiment would be the use of a passive, sub-irrigation system. This would allow the growth of a riparian area.

The irrigation system would consist of pipes set into the bypass channel BP walls and extending laterally out from there. The pipes would be a simple leach system that would sub-irrigate a portion of the bank.

The number of pipes and their placement would be determined by individual site conditions and requirements.

Having thus described in detail a preferred selection of embodiments of the present invention, it is to be appreciated and will be apparent to those skilled in the art that many physical changes could be made in the apparatus without altering the invention, concepts and principles embodied therein. The invention does not require that all the advantageous features and all the advantages need to be incorporated into every embodiment of the invention. The present embodiments are therefore to be considered in all respects as illustrative and not to be restrictive.

Advantages of the Invention

From the description above, several advantages of my migratory fish bypass channel become evident, including:

(A) It provides a simple, mechanical-free, river or stream-like environment to pass migratory fish around a dam or obstruction.
(B) Its construction provides for minimal maintenance and is easily adapted to meet the migratory needs of a variety of fish species, both in the United States and abroad.
(C) The bypass channel will provide an environment that will sustain aquatic life and forage species. This can provide a year-round fishery and recreation site.
(D) The bypass channel can provide the opportunity for education through the use of nature trails and tours.

Operation of the Invention

The migratory fish bypass channel BP operates in the following manner:

The bypass channel inlet 10 is situated to take advantage of the main flow or thalweg T in the reservoir R.

This inlet 10 can be fitted with a flow control weir 11 or head gate. This device can be mechanized or manual as site conditions dictate.

The migratory juveniles follow the thalweg T or main current through the reservoir R. The juveniles or smolt are attracted to the inlet 10 by the increased velocity created by the bypass channel BP.

They are deceived by the natural-like environment and believe they have located a river or stream. Once lured into the bypass channel BP their tendency to follow bulk flows or the thalweg T entices them downstream.

The sand, gravel, cobbles 35, and the like duplicate or simulate or replicate a river or stream. These sand, gravel and cobbles 35 are taken from the channel excavation and screened or sorted according to size. They are then cleansed of residues and stored for placement.

The excavation is lined with pneumatically-placed concrete, shotcrete, or gunite 22. The construction of natural-like features 31–39 and a river-like channel FIG. 3 occurs at this time. This creates a bedrock type of condition suitable for the retention of sand, gravel and cobbles 35, and the like.

The channel above the dam FIG. 5A or obstruction has a low gradient or drop. This allows for a strong flow of water and an increased velocity. It minimizes the excavation and disturbance above the dam.

The channel below the dam FIG. 5B has a steeper gradient or drop. The use of ledges and riffles 39 in FIG. 6 allows the channel FIG. 3 to meander along a river terrace, then drop to a lower terrace quickly and dramatically.

These ledges and riffles 39 help create flows and velocities below the dam D to attract adult fish on their upstream migration. Additionally, they aerate or oxygenate the water to provide another means to attract adults.

Upon completion of the simulated bedrock channel FIG. 3, large boulders 32, trees 33 and other natural like features are placed.

When the larger materials are in place, the sand, gravel, cobbles 35 and the like are placed at various locations along the channel FIG. 3. Water from the reservoir R is then turned into the channel to simulate flood or springtime water flows.

These flows will naturally sort and deposit the sand, gravel, cobbles 35 and the like. This natural sorting will create a river-like environment to sustain aquatic life.

At this time, native species of river life are collected and introduced into this system. These would include, but not be limited to, minnows, nymphs, larvae, crayfish, frogs, plants, etc.

These species would distribute themselves according to their preferred habitats and provide a forage source for resident and migratory fish.

Once the fish are in the system, the natural-life conditions will allow them to determine their own rate of migration.

This will allow them to mature on an individual basis and, therefore, be better prepared for the ocean and adulthood.

This will provide a hardier fish that has a greater chance for survival. This in turn will result in an increased return of adult fish to spawn and help reverse the decline in fish stocks.

Although the present invention has been described in considerable detail with reference to certain preferred versions thereof, other versions are possible. For example, an additional alternative would be the ability to rear hatchery-raised fingerlings in a more natural condition, as provided by tributary 50. This would result in a hardier, more wild-like juvenile fish, better equipped to deal with the rigors of migration.

I claim:

1. A method for assisting fish in bypassing an obstruction within a waterway, the method comprising:
   (a) providing a waterway flow channel, the waterway flow channel including a flow channel inlet and a flow channel outlet for respectively directing water flow into and out of the waterway flow channel;
   (b) lining the waterway flow channel with at least one of concrete, shotcrete and gunite, so as to produce a sealed waterway flow channel mimicking a bedrock-like condition;
   (c) creating at least one water flow modification structure in the waterway flow channel, with the at least one of concrete, shotcrete and gunite, the at least one water flow modification structure selected from the group comprising riffles, ledges, undercut banks and scour holes;
   (d) incorporating the at least one water flow modification structure in a manner so as to provide a water flow modified from that in the waterway;
   (e) inducing fish traveling in the waterway to enter the flow channel inlet and be directed around the obstruction;
   (f) placing at least one natural waterway resource item in the waterway flow channel, the at least one natural waterway resource item selected from the group comprising sand, gravel, cobbles, boulders, logs, trees, gravel bars and root masses;
   (g) releasing water into the Waterway flow channel, so as to sort the at least one natural waterway resource item in a manner so that the waterway flow channel mimics a waterway bed;
   (h) introducing into the waterway flow channel at least one forage source for fish, the at least one forage source for fish selected from the group comprising minnows, nymphs, larvae, crawfish, frogs and plants;
   (i) providing each of the flow channel inlet and the flow channel outlet in fluid communication with the waterway and at a location thereof away from the obstruction; and
   (j) causing water passing through the waterway to be diverted separately around the obstruction through the waterway flow channel.

2. A method as in claim 1 and further including the step of:
   (a) providing a water cooling device, operatively associating the water cooling device with the waterway flow channel to control the temperature of the water therein.

3. A method as in claim 1 and further including the step of:
   (a) providing at least one second water inlet between the flow channel inlet and the flow channel outlet, the at least one second water inlet selected from the group consisting of oxbow sections and tributaries, the second water inlet adapted to add a separate water flow into the waterway flow channel.

4. A method as in claim 3 and further including the step of:
   (a) creating a man-made spring in the at least one second water inlet.

* * * * *